(12) United States Patent
Taylor et al.

(10) Patent No.: US 9,818,166 B2
(45) Date of Patent: Nov. 14, 2017

(54) GRAPH-BASED APPLICATION PROGRAMMING INTERFACE ARCHITECTURES WITH PRODUCER/CONSUMER NODES FOR ENHANCED IMAGE PROCESSING PARALLELISM

(71) Applicant: Intel Corporation, Santa Clara, CA (US)

(72) Inventors: Stewart N. Taylor, Los Altos, CA (US); Dmitry Krasnov, Nizhniy Novgorod (RU)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 14/664,736

(22) Filed: Mar. 20, 2015

(65) Prior Publication Data
US 2016/0210724 A1    Jul. 21, 2016

Related U.S. Application Data

(60) Provisional application No. 62/104,226, filed on Jan. 16, 2015.

(51) Int. Cl.
*G06T 1/20* (2006.01)

(52) U.S. Cl.
CPC ................................ *G06T 1/20* (2013.01)

(58) Field of Classification Search
CPC .................................................. G06T 1/20
USPC ...................................................... 382/307
See application file for complete search history.

(56) References Cited

U.S. PATENT DOCUMENTS

| 5,808,625 | A  | 9/1998  | Picott   |
| 6,762,764 | B2 | 7/2004  | Hiwada   |
| 8,250,556 | B1 | 8/2012  | Lee et al. |
| 8,527,972 | B2 | 9/2013  | Shimura  |
| 8,549,529 | B1 | 10/2013 | Schildan |

(Continued)

OTHER PUBLICATIONS

International Search Report and Written Opinion for International Application No. PCT/US2015/064094, dated Mar. 21, 2016.

(Continued)

*Primary Examiner* — Amandeep Saini
(74) *Attorney, Agent, or Firm* — Green, Howard & Mughal, LLP

(57) ABSTRACT

A flexible representation of fine grain image buffer validity is included in an image graph implementation API to provide a mechanism for a graph node developer to communicate limits of scheduling constraints imposed by a graph's source and destination images. An image graph executor may employ a producer and/or consumer node scoreboard object or function defined through the image graph implementation API to schedule work tasks to hardware resources in a more efficient manner. In some embodiments, an image processing engine is configured to begin processing completed source data blocks (e.g., image tiles) through an image graph before all upstream tasks associated with the source image are complete. In further embodiments, a destination image is to be indicated as at least partially complete so that work dependent on one more completed data blocks may begin before the destination image is fully buffered into memory.

22 Claims, 15 Drawing Sheets

(56) References Cited

U.S. PATENT DOCUMENTS

| | | |
|---|---|---|
| 2005/0235287 A1* | 10/2005 | Harper .................. G06T 1/20 718/100 |
| 2007/0078846 A1 | 4/2007 | Gulli et al. |
| 2008/0049022 A1 | 2/2008 | Sherb et al. |
| 2008/0117216 A1 | 5/2008 | Dorie |
| 2011/0078500 A1 | 3/2011 | Douros et al. |
| 2013/0103734 A1 | 4/2013 | Boldyrev et al. |
| 2014/0359563 A1 | 12/2014 | Xie et al. |
| 2015/0046678 A1 | 2/2015 | Moloney et al. |
| 2015/0379671 A1 | 12/2015 | Brothers et al. |

OTHER PUBLICATIONS

Non-Final Office Action, dated Sep. 30, 2016, for U.S. Appl. No. 14/664,743.

Non-Final Office Action, dated Oct. 20, 2016, for U.S. Appl. No. 14/664,725.

Kramer, R. et al., "The Combining DAG: A Technique for Parallel Data Flow Analysis", IEEE Transactions on Parallel and Distributed Systems, Aug. 1994, vol. 5, No. 8, pp. 805-813.

Yamauchi, Tsukasa et al., "SOP: A Reconfigurable Massively Parallel System and Its Control-Data-Flow based Compiling Method", NEC Laboratory, IEEE 1996, pp. 148-156.

The OpenVX Specificaition, Copyright 2011-2014; downloaded on Mar. 16, 2015. Found at: https://www.khronos.org/registry/vx/specs/1.0/html/ (4 pages).

Eruhimov et al., "Realtime traffic sign recognition on mobile processors", Itseez, GTC 2013. Found at: http://on-demand.gputechconf.com/gtc/2013/presentations/S3548-RT-Traffic-Sign-Recognition.pdf, (16 pages).

Gautam et al., "The OpenVX™ [Provisional] Specification", Khronos Group, Version 1.0, Document Revision: r23564, Generated on Thu Oct. 17, 2013. Found at: http://www.slideshare.net/Khronos_Group/open-vx-provisional-specification-1010r23564oct17 (304 pages).

Rainey et al., "Addressing System-Level Optimization with OpenVX Graphs", 2014 IEEE Conference on Computer Vision and Pattern Recognition Workshops (CVPRW). Found at: http://perceptonic.com/goksel/OpenVX/OpenVX_IEEE_EVW_2014.pdf (6 pages).

Trevett, "Open Standard APIs for Embedded Vision Processing", Khronos Group 2014. Found t: https://www.khronos.org/assets/uploads/developers/library/2014-gdc/Khronos-OpenVX-GDC-Mar14.pdf (28 pages).

Trevett, "APIs for Vision Acceleration, Camera Control and Sensor Fusion", Khronos Group, 2013. Found at: http://www.slideshare.net/Khronos_Group/openvx-overview (24 pages).

Notice of Allowance dated Feb. 27, 2017 for U.S. Appl. No. 14/6645,725.

Notice of Allowance dated Mar. 29, 2017 for U.S. Appl. No. 14/664,743.

\* cited by examiner

GRAPH-BASED APPLICATION PROGRAMMING INTERFACE ARCHITECTURES WITH PRODUCER/CONSUMER NODES FOR ENHANCED IMAGE PROCESSING PARALLELISM

CROSS REFERENCE TO RELATED APPLICATIONS

This application claims the benefit under 35 U.S.C. Sec. 119(e) of U.S. provisional application 62/104,226 titled "Graph-based Application Programming Interface Architectures and Optimization Engines For Enhanced Image Processing Parallelism," filed Jan. 16, 2015.

BACKGROUND

Computer vision processing (e.g., face/body/gesture tracking, object and scene detection/reconstruction, automated visual inspection, etc.) is becoming an increasingly important capability of computing device platforms. Accelerated visual processing optimized for performance and/or power is particularly important for real time, mobile, and/or embedded device applications. Increasingly powerful processors and image sensors are enabling computing platforms with greater visual intelligence. However, distributing complex vision processing algorithms across device platform processors best suited to the application remains a difficult problem.

A typical image processing application performs several successive operations on images with the output of one operation used as the input of another operation (e.g., pipeline stages). A graph-based image processing implementation optimization API provides a useful level of abstraction for vision processing execution and memory models, and provides a formal description of an operation sequence as a directed acyclic graph (DAG). The DAG is a collection of nodes that describe the image processing tasks by means of connections between them. Nodes of a graph correspond to source and destination data (e.g., images) or to operations on images. Edges of a graph define data flow in a task. A connection between nodes means that the result of one operation ("output") is used as the input for another operation. Each node may be associated with one or more hardware resource where the node is to be executed.

The OpenVX 1.0 specification released October 2014 by the Khronos Group, is one example of a graph-based image processing implementation optimization API providing a framework for managing and executing graphs. With such an API, an application developer may define image processing tasks by building a graph of the image processing functions and rely on the API framework for implementation over a wide array of platforms. An implementer provides a graph compiler and graph executor that is compatible with the graph-based implementation API and is configured to most efficiently execute image processing tasks for a given implementation by passing image data through the graph nodes.

It is advantageous for a graph-based image processing implementation API to provide implementers with the information needed to make task/work assignments and scheduling decisions that may, for example, improve efficiency through parallelism.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
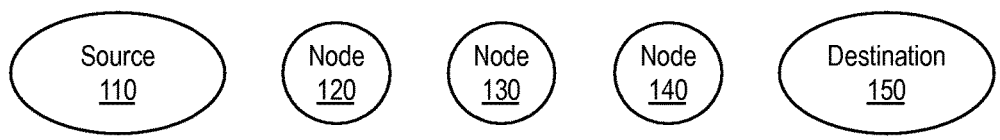
FIG. 1A illustrates nodes to be included in an image processing graph, in accordance with some embodiments.

One or more embodiments are described with reference to the enclosed figures. While specific configurations and arrangements are depicted and discussed in detail, it should be understood that this is done for illustrative purposes only.

Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and fill software instruction sequences, may not be shown in detail in order not to obscure the material disclosed herein.

Certain portions of the material disclosed herein may be implemented in hardware, for example as logic circuitry in a central processor core. Certain other portions may be implemented in hardware, firmware, software, or any combination thereof. At least some of the material disclosed herein may also be implemented as instructions stored on a machine-readable medium, which may be read and executed by one or more programmable processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for extracting parallelism in an image graph processing. Techniques and architectures described below for exemplary image processing embodiments can be applied to many other data blocks generalized to technologies such as, but not limited to, signal processing and audio/video coding.

In some embodiments, an engine for executing a set or series of imaging operations is expressed by an image processing software developer as a graph or series of function calls. A graph is a class of objects that contain all information to organize calculations among nodes in the graph. A graph class interface of a graph API enables adding nodes to a graph and connecting their input and output ports. Nodes of an image processing graph correspond to source and destination data and operations to be performed on images (image data blocks). FIG. 1A illustrates a set operations with each operation contained in a compute node (e.g., node 120, node 130, node 140) or source/destination node.

Source node 110 and destination node 150 are each a data array or data stream entered into the graph explicitly.

Each operation of a compute node may be selected, for example, from a library of many hundreds/thousands of functions. Any low level compute library or API (e.g., an OpenCL compliant library) may be enlisted within each node. In some embodiments, the compute node functions are designed for whole image processing. The image graph implementation API provides function(s) for creating/adding nodes, for example:

```
// Create Nodes
SrcNode::Params src1Params( );
Node    *in1=nfIA.CreateNode(SrcNode::NodeUnique-
    Name( ), &src1Params);
. . .
SimpleNode_2_1::Params simple1Params(idmAdd);
Node *add=nfIA.CreateNode(SimpleNode_2_1::NodeU-
    niqueName( ),
    &simple1Params);
```

Figure 1B:
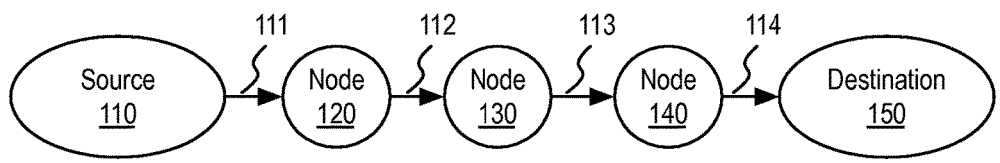
FIG. 1B illustrates connecting nodes into an image processing graph, in accordance with some embodiments.

Node objects contain information about node connectivity (number of input and output ports) and the main parameters for the function associated with the node. Objects of derivative classes can contain other parameters, depending on the node function. FIG. 1B illustrates a connection of nodes to create image processing tasks. The graph edges 111, 112, 113, 114 are provided by the image processing software developer to define the flow of the data array/data stream from source node 110 through the compute nodes 120, 130, 140, to destination node 150. The graph-based implementation API provides function(s) for connecting an image graph, for example:

```
// Connect Graph
g→Link(in1Id,0, addId,0);
```

Numbers of objects and ports are used by the Link method to connect the output port of one object with the input port of another object.

Figure 1C:
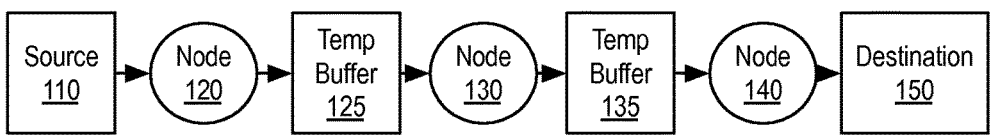
FIG. 1C illustrates execution of an image processing graph, in accordance with some embodiments.

In some embodiments, the image graph is then transformed, or compiled, by a graph compiler into a sequence of image processing function calls that are applied to data blocks or small parts of the input image data referred to herein as a tiles. Tiles include slices having the whole width of an image, as well as rectangles of arbitrary dimension and orientation within an image. A compile member function of a class compiles the graph object. During compile, the graph is verified for absence of cycles, absence of isolated nodes, correspondence of data types and number of channels between nodes. In embodiments, the compile function is further responsible for determining an optimal tile size according to an available cache size. During image graph execution, the passage of a data block through compute nodes between source node 110 and destination node 150 constitutes a series of image processing tasks. As illustrated in FIG. 1C, execution of the image graph may be conceptualized with temporary buffers 125, 135 inserted between compute nodes 120, 130 and 130, 140, respectively used for retaining the results of each task.

Figure 2A:
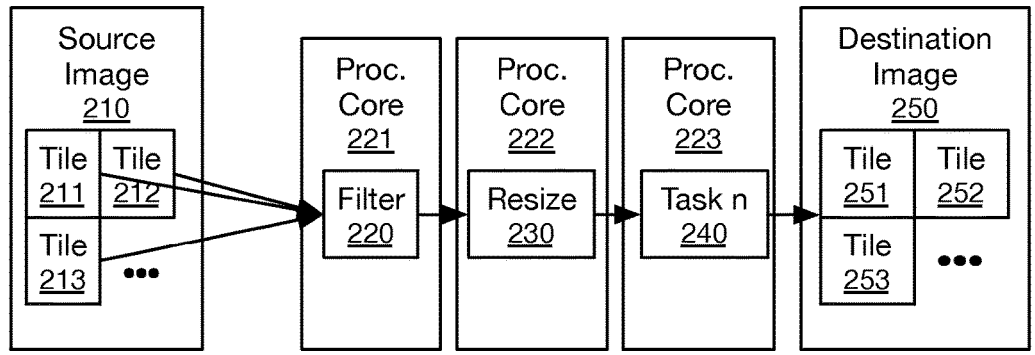
FIG. 2A illustrates graph-based optimization through task-based decomposition, in accordance with some embodiments.

In some embodiments, a graph optimization engine performs a graph-based optimization entailing a task-based decomposition. For task-based decomposition, the output of one operation (e.g., in node 120) used as the input of another operation (e.g., in node 130). An example of a graph-based optimization through task-based decomposition is illustrated in FIG. 2A, where separate processor cores or compute units are assigned different tasks. For example, a processor core 221 is responsible for a filter 220, processor core 222 is responsible for a resize 230, and processor core 222 is responsible for an $n^{th}$ task. Many image processing applications utilize very large images (e.g., several megapixels), and the total memory used for image processing may exceed the size of a local buffer (e.g., a second-level cache of a processor). In these conditions the bottleneck becomes memory access, so source image 210 is decomposed into data blocks associated with sections of source image 210. These image fragments (e.g., source tiles 211, 212, 213) are then processed by processor cores 221, 222, 223 to generate destination tiles 251, 252, 253 of destination image 250.

Figure 2B:
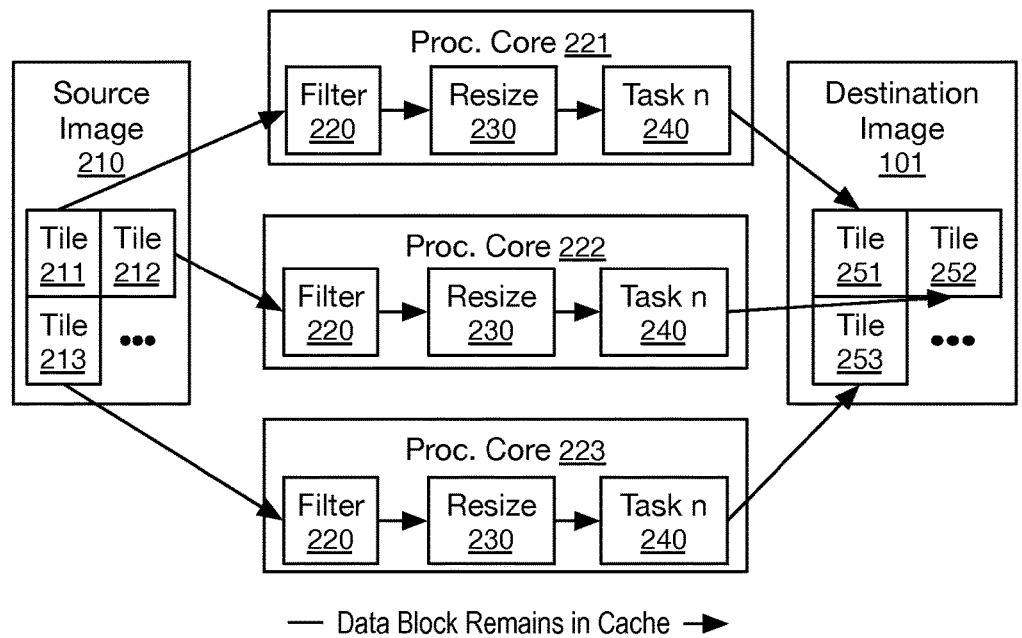
FIG. 2B illustrates graph-based optimization through spatial decomposition, in accordance with some embodiments.

In some embodiments, a graph optimization engine performs a graph-based optimization entailing a tile-based, or spatial, decomposition. As illustrated in FIG. 2B, each processor core 221, 222, 222 is responsible for performing the filter 220, resize 230, and the $n^{th}$ task 240 for one source tile 211, 212, 213, respectively. As an example, one efficiency possible with tile-based decomposition is the retention of a data block (e.g., corresponding to one tile) within a local memory buffer (e.g., a level-two cache associated with a processor core) as successive tasks are performed on the data block.

Figure 2C:
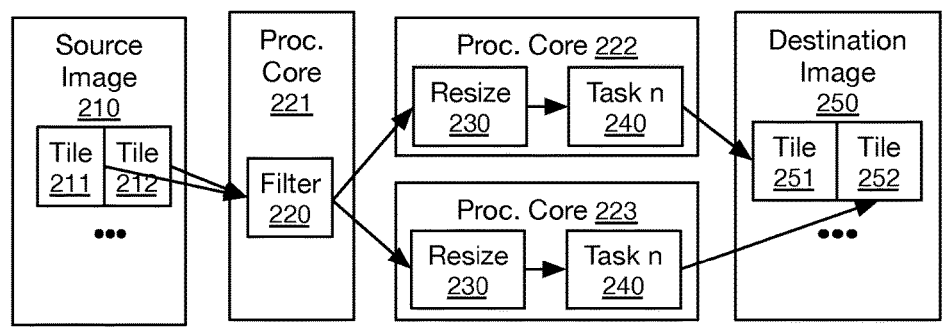
FIG. 2C illustrates a graph-based optimization entailing both spatial and task decomposition.

In some embodiments, a graph optimization engine performs a graph-based optimization entailing both spatial and task decomposition. As depicted in FIG. 2C, processor core 221 is responsible for filter 220, which may be computationally expensive relative to resize 230 and $n^{th}$ task 240. Processor cores 222 and 223 may be assigned the resize 230 and $n^{th}$ task 240 to output a separate destination tile 251, 252 from one source tile 211, 212. Processor core 221 processes both source tiles 211, 212 to complete filter task 220.

Figure 2D:
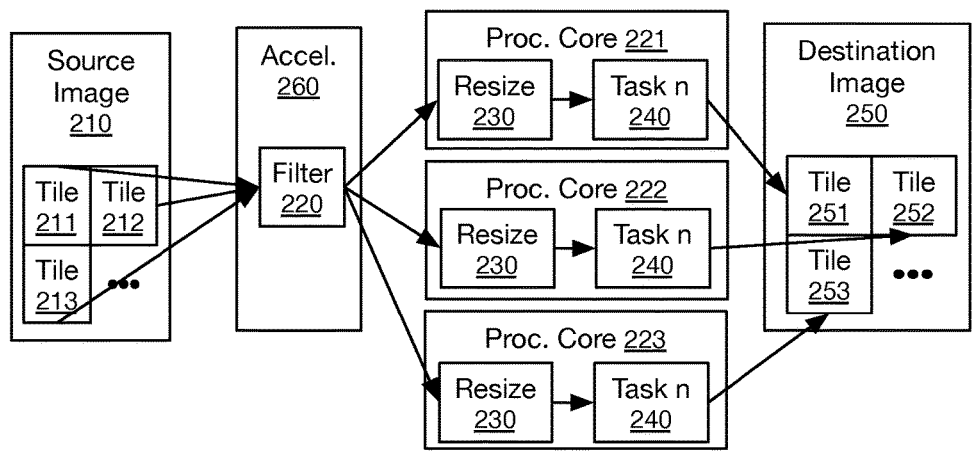
FIG. 2D illustrates both spatial and task decomposition over heterogeneous hardware resources, in accordance with some embodiments.

In some embodiments, a graph optimization engine performs a graph-based optimization entailing either or both spatial and task decomposition over heterogeneous hardware resources. FIG. 2D illustrates both spatial and task decomposition over heterogeneous hardware resources including a hardware accelerator 260 in addition to multiple cores of a processor. In the depicted example, accelerator 260 handles filter task 220 for all source tiles 211, 212, and 213. One processor core 221, 222, 223 is responsible for performing both resize task 230 and $n^{th}$ task 240 on a filtered data block corresponding to one source tile 211, 212, 213, respectively.

Explicitly splitting a source image into fragments and performing the required operation on these fragments is particularly difficult if an operation requires data outside an image fragment, or the processing operations require a change in the fragment size. Furthermore, in the above embodiments, parallelization of the calculation sequence may be advantageous. For example, the processing of one image fragment, then another, need not be scheduled such that all fragments are processed through a first task by one hardware resource before any fragment is processed through another task by another hardware resource. Greater processing efficiency may be had where processing of a fragment through one task is instead predicated only on that fragment having been first processed through a preceding task, regardless of the status of any other fragment processing.

In a conventional architecture, pipeline processing is typically initiated only after all data to be input into the pipeline is available (e.g., after an entire source image has been scanned). Similarly, work of a subsequently staged pipeline would be initiated (e.g., by a graph executor) only upon any upstream pipeline outputting a complete destination image. In some embodiments described herein however, the image processing engine is configured to begin processing completed source data blocks (e.g., image tiles) through an image graph before all upstream tasks associated with the source image are complete. In further embodiments, a destination image is to be indicated as at least partially complete so that work dependent on one more completed data blocks may begin before the destination image is fully buffered into memory. In further embodiments, two image processing pipelines are linked through a producer-consumer node with the work completed by a first pipeline being identified through the producer-consumer node serving as an available input to a second image pipeline.

Figure 3A:
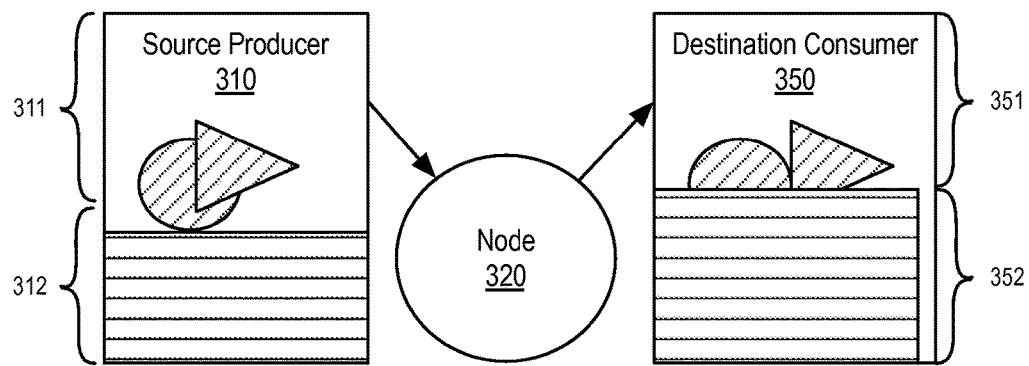
FIGS. 3A and 3B illustrate an image graph including a compute node linked with a producer node, in accordance with some embodiments.

In some embodiments, a graph-based image processing implementation API provides a framework for defining a "producer" node functionalized to provide fine grain buffer management. FIG. 3A illustrates a compute node 320 linked with a producer node 310. Producer node 320 is configured to differentiate between a valid source buffer portion 311 and an invalid source buffer portion 312 in contrast to an atomic source image buffer (e.g., source 110 illustrated in FIG. 1C). As such, a producer node is associated with one or more functions for fine-grained data block (e.g., image tile) validity state monitoring. One or more data block associated with valid buffer portion 311 may then be made eligible for processing by compute node 320 before all source data blocks are valid. Functionalized with fine grain source validity reporting, an image graph processing implementation of node 320 may extract greater (finer grain) parallelism to increase image graph processing efficiency.

In some embodiments, a graph-based image processing implementation API provides a framework for defining a "consumer" node functionalized to provide fine grain destination buffer management. FIG. 3A further illustrates compute node 320 linked with a consumer node 350. Instead of an atomic destination image buffer (e.g., destination 150 illustrated in FIG. 1C), consumer node 350 may identify both a valid buffer portion 351 and an invalid buffer portion 352. One or more tiles associated with valid buffer portion 351 have passed through compute node 320. As such, a consumer node is associated with one or more functions for fine-grained data block (e.g., image tile) validity state reporting. One or more data block associated with valid buffer portion 351 may then be made eligible for processing by another pipeline before all destination data blocks are valid. Functionalized with fine grain destination validity reporting, an image graph processing implementation of a downstream pipeline may extract greater (finer grain) parallelism to increase image graph processing efficiency.

In the exemplary embodiment illustrated in FIG. 3A, valid producer buffer portion 311 becomes larger with time, for example as additional scan lines are streamed in. For such embodiments, a validity reporting object associated with source producer 310 may utilize any indication to demark valid and/or invalid producer buffer portions 311, 312. Exemplary source buffer validity indications include, but are not limited to: a valid buffer size; valid buffer proportion; an invalid buffer size; an invalid buffer proportion; a valid/invalid buffer position index; or specific address (offsets) for each valid and/or invalid data block (e.g., image tile). Likewise, as valid consumer buffer portion 351 becomes larger with time, for example as additional scan lines are processed through node 320, a validity reporting object associated with consumer 350 may utilize any indication to demark valid and/or invalid consumer buffer portions 311, 312. Exemplary destination buffer validity indications include, but are not limited to: a valid buffer size; valid buffer proportion; an invalid buffer size; an invalid buffer proportion; a valid/invalid buffer position index; or specific address (offsets) for each valid and/or invalid data block (e.g., image tile).

Figure 3B:
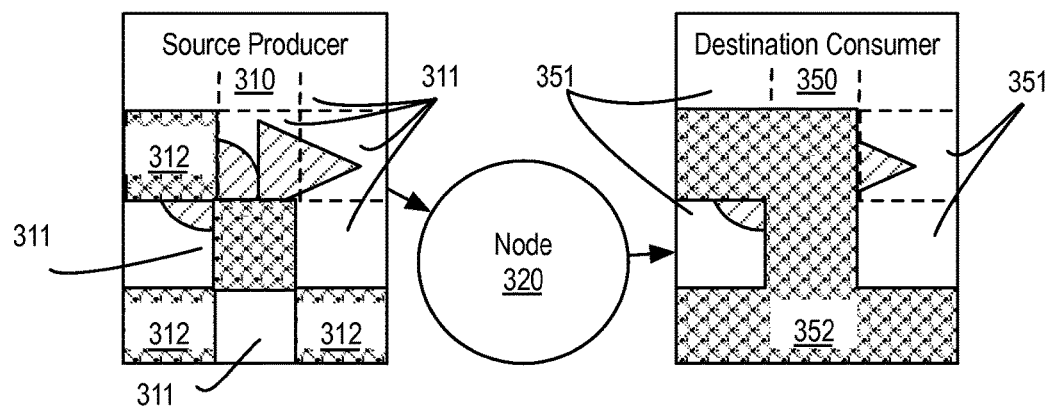

In another exemplary embodiment illustrated in FIG. 3B, valid producer buffer portion 311 becomes larger with time, for example as additional tiles are output as various predecessor tasks of an upstream pipeline are completed. Unlike a scanning or other streaming embodiment illustrated in FIG. 3A, producer data blocks may complete in an ad-hoc manner as a function of their respective dependencies and parallelized scheduling. For such embodiments, a data block availability reporting object of source producer 310 may again utilize any technique to demark valid and/or invalid buffer portions 311, 312, such as but not limited to specific address (offsets) associated with each valid and/or invalid data block (e.g., image tile). Likewise, consumer data blocks may be completed by node 320 in an ad-hoc manner as a function of their respective dependencies and availability at source producer 310. For such embodiments, a data block availability reporting object of destination consumer 350 may again utilize any technique to demark valid and/or invalid buffer portions 351, 352, such as but not limited to: specific address (offsets) associated with each valid or invalid data block (e.g., image tile).

Figure 4A:
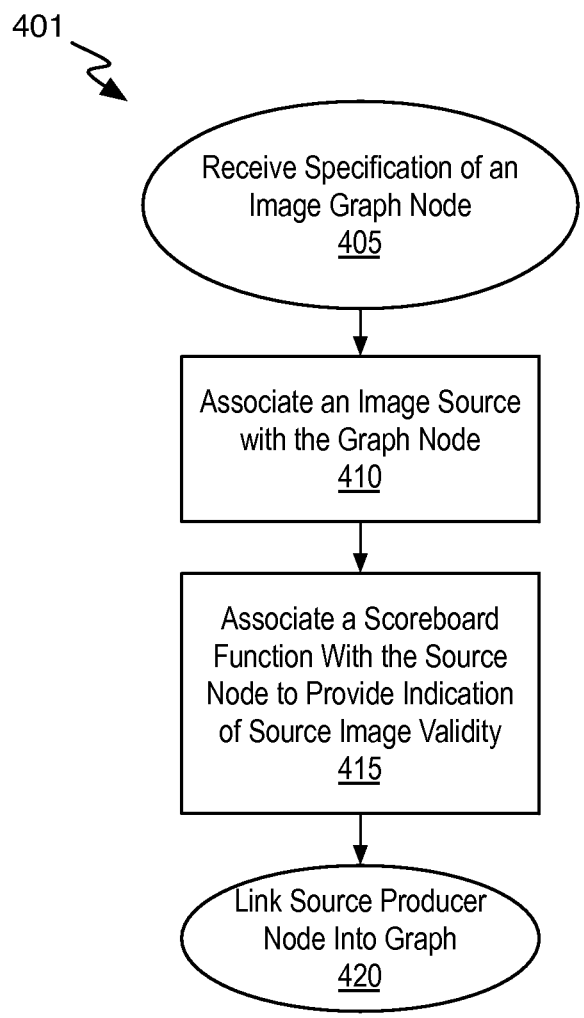
FIG. 4A is a flow diagram illustrating a method for creating a producer node, in accordance with some embodiments.

FIG. 4A illustrates a producer node creation method 401. Method 401 may be performed, for example, by a graph-based image processing API. Method 401 begins with receiving a specification of an image graph node at operation 405 through any known technique (via user control activation in GUI). At operation 410, a source image object is associated with a specified graph node at operation 410. To enable fine grain source buffer state management, a scoreboard object or function is further associated with the source image object, thereby defining a producer node at operation 415. In some embodiments, the scoreboard object/function is to provide an indication of a source image state that parameterizes the completeness of the buffered source image and/or availability of one or more source data blocks. In some embodiments, the scoreboard object is to return source image state information when called by a graph executor. A scoreboard object may for example return any of a valid buffer size, valid buffer proportion, an invalid buffer size, an invalid buffer proportion, a valid/invalid position index, or specific address (offsets) for each valid and/or invalid data block. The functionalized producer node is linked as an input to a processing node of an image graph at operation 420, for example using any known technique.

Figure 4B:
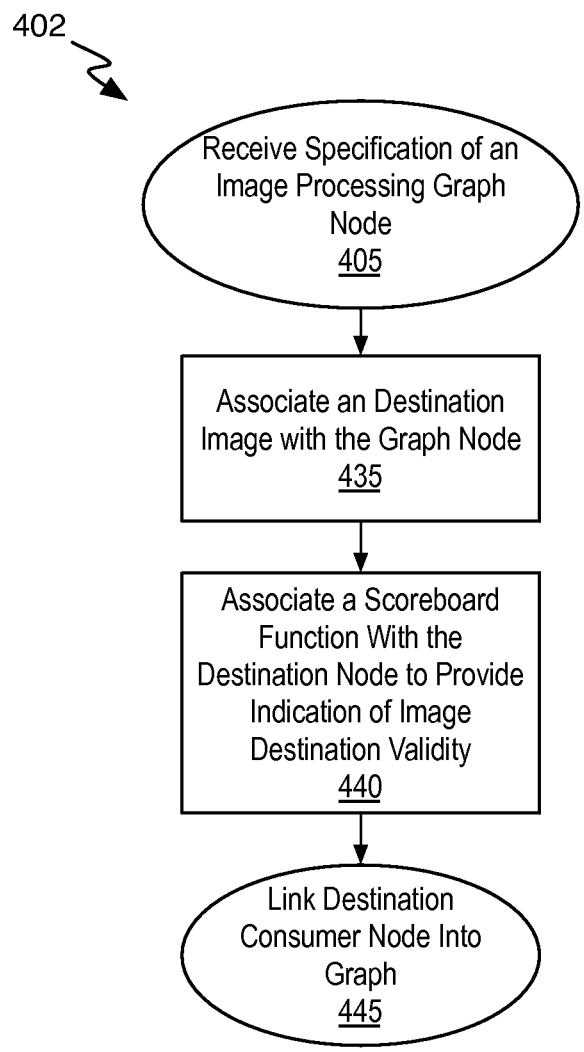
FIG. 4B is a flow diagram illustrating a method for creating a consumer node, in accordance with some embodiments.

FIG. 4B illustrates a consumer node creation method 402. Method 402 may be performed, for example, by a graph-based image processing implementation API. An image graph node specification is received at operation 405 and at operation 435 a destination image object is associated with the created node. To enable fine grain destination buffer state management, a scoreboard object and/or function is further associated with the destination image to define a consumer node at operation 440. One or more producer node interface functions are provided. In some embodiments, the scoreboard object/function is to provide an indication of destination image state that parameterizes the completeness of the buffer destination image and/or availability or validity state of one or more destination data blocks. In some embodiments, the scoreboard object is to return destination image state information when called by a graph executor. The scoreboard object may for example return any of a valid buffer size, valid buffer proportion, an invalid buffer size, an invalid buffer proportion, a valid/invalid position index, or specific address (offsets) for each valid and/or invalid data block. With the scoreboard function in place, the functionalized consumer node is linked at operation 445 to an output of a processing node of an image graph using any known technique.

In some embodiments, an indication of source/destination completeness is provided as a reporting mechanism utilized by an image graph executor. In some embodiments, a tile-based scoreboard is maintained and/or monitored by the graph executor. In further embodiments, a "listener" callback is utilized to indicate when the scoreboard has been updated at either a fine-grained tile level, or a coarse-grain image level.

Figure 5A:
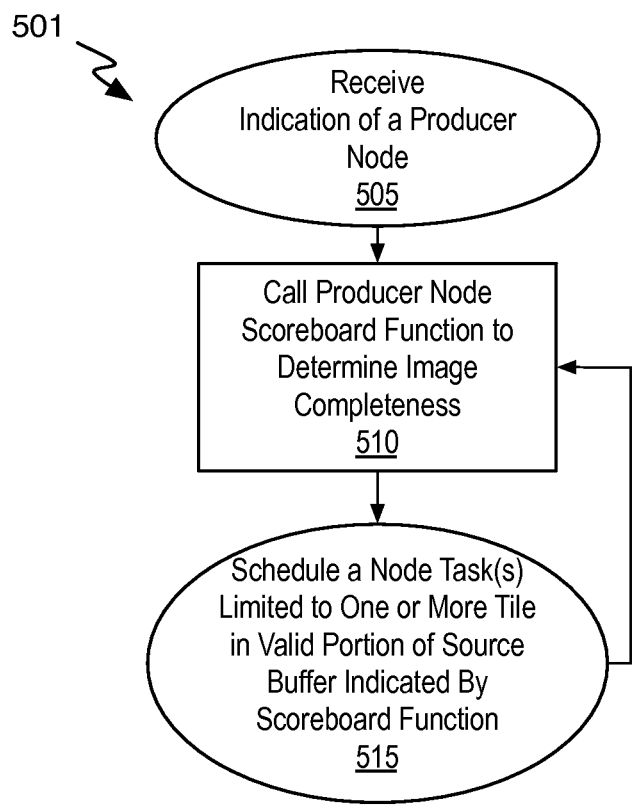
FIGS. 5A and 5B are flow diagrams illustrating a method for executing an image graph including a producer node, in accordance with some embodiments.

FIG. 5A illustrates a graph execution method 501, which may be performed, for example by a centralized image graph work scheduler (e.g., graph executor or graph execution engine). At operation 505 the graph executor receives an indication of a producer node, for example based on a framework defined in a graph-based image processing implementation API. At operation 510, a call is made to the producer node scoreboard object or function to ascertain a state of source image completeness/availability. Upon receiving source image completeness information, at operation 515 the graph executor schedules one or more processing task that is dependent only on one or more data block (e.g., tile) within a corresponding valid portion of the source buffer. Operations 510 and 515 may be iterated, for example with each iteration entailing the scheduling or execution of a node task for one or more additional completed tiles. In some embodiments, a scoreboard object is polled with each performance of operation 510 until the scoreboard object returns an indication that the source image buffer is complete (e.g., completely valid or completely processed).

Figure 5B:
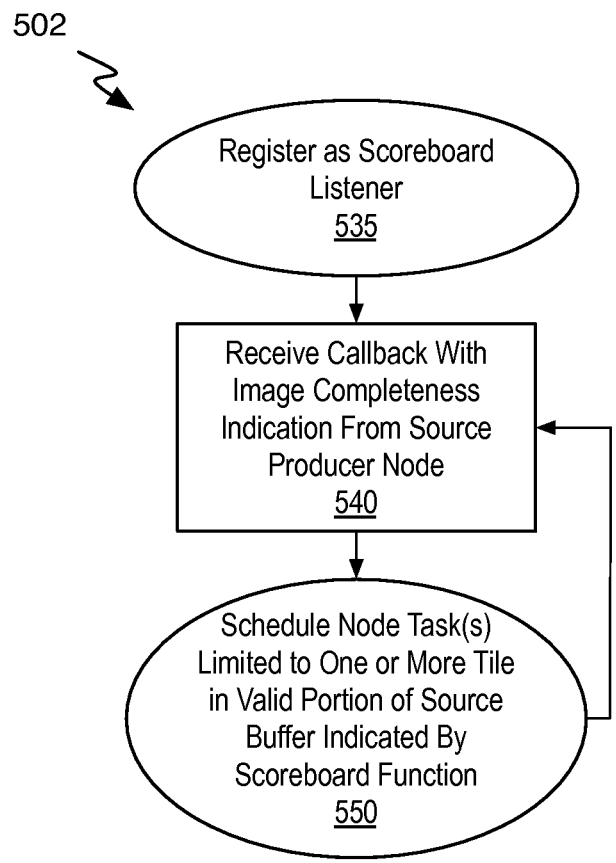

FIG. 5B illustrates a graph execution method 502, which may be performed, for example by a centralized image graph work scheduler (e.g., graph executor or graph execution engine), or may alternatively be performed by a node in the image graph linked with a source producer. At operation 535, the graph executor or graph node registers with a scoreboard object and/or with the associated source producer. As a registered listener, the graph executor then receives one or more callback with image completeness information as image buffer portions become valid. In some embodiments, a new callback with updated completeness information triggers scheduling of a dependent node task at operation 550 where the graph executor, or a graph node itself, dispatches a processing task to process one or more data block (e.g., tile) within a valid portion of the source buffer. Operations 540 and 550 may be iterated. For example, each iteration may be in response to the scheduling or execution of a node task for one or more additional completed tiles. Each iteration may be in response to successive callbacks providing distinct completeness information.

In further embodiments, for example in implementations lacking a graph executor, every node linked with a producer node registers as a scoreboard listener. Each of the plurality of registered listener nodes is to receive a callback with image completeness information as image buffer portions become valid. Such distributed embodiments are an alternative to architectures employing a centralized work scheduler/executor.

In some embodiments, a scoreboard and/or a callback object or function is defined in a graph-based image processing implementation API, for example as either a public member function of the implementation API or as an overridden public member function.

In the specific example below, a "ProducerNode" object class specifying the "IsReady" function is created. A call to the IsRead, function returns a parameter indicative of whether a particular rectangle is ready. When a ProducerNode class accumulates enough data, the class is then to call the function "ProgrammerNode:OnStatusChange( )," that is to notify the graph execution engine (executor) of the change with igraph→UpdateExecuorStatus( ):

virtual bool DMIP::ProducerNode::IsReady (IppiRect & rect)

In the above, the parameter rect specifies an image rectangle for which to check for data availability, and the IsRead function returns "true" if pixel data from the image rectangle is ready. The callback function may then be implemented in the producer node object class as:

void DMIP::ProducerNode::OnStatusChanged( )

to notify a graph executor of new data. A call to OnStatusChanged occurs upon receiving new data, and in response, the graph executor may re-check non-processed input blocks.

```
void ProducerNode::OnStatusChanged( )
{
    stateId++;
    // generate event to executor
    Graph* owner = this->m_inode->m_parent;
    iGraph* igraph = owner->IGraph( );
    if (igraph->m_status == idmExecuting || igraph->m_status ==
idmPausing|| igraph->m_status == idmPaused)
        igraph->UpdateExecutorStatus( );
}
```

Figure 6:
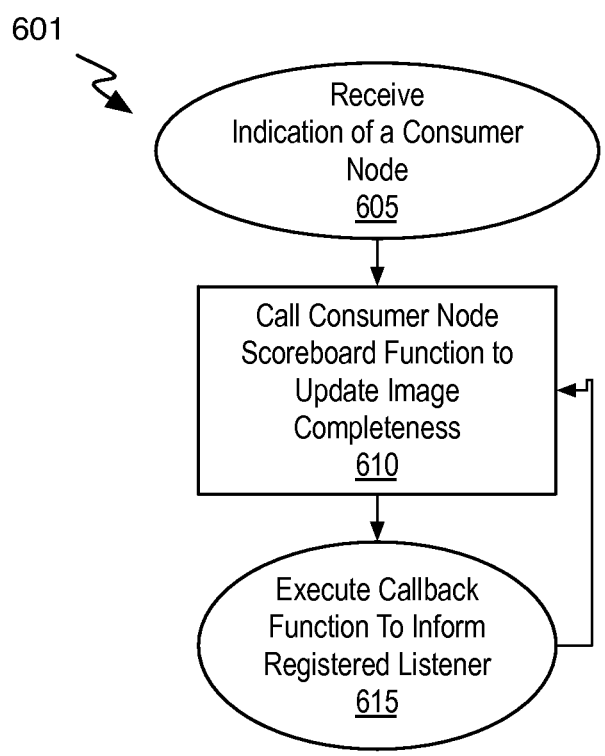
FIG. 6 is a flow diagram illustrating a method for executing an image graph including a consumer node, in accordance with some embodiments.

A consumer node object may be similarly specified and member function called upon to update a scoreboard object and/or initiate one or more callback functions. FIG. 6 illustrates a graph execution method 601, which may be performed, for example by a centralized image graph work scheduler (e.g., graph executor or graph execution engine). At operation 605 the graph executor receives an indication of a consumer node, for example based on a framework defined in a graph-based image processing implementation API. At operation 610, a call is made to the consumer node scoreboard object or function to update a state of a destination image completeness/availability. Upon posting new image completeness information, at operation 615 the graph executor initiates a callback function to inform a registered listener. Operations 610 and 615 may be iterated, for example with each iteration informing one additional registered listener.

Figure 7A:
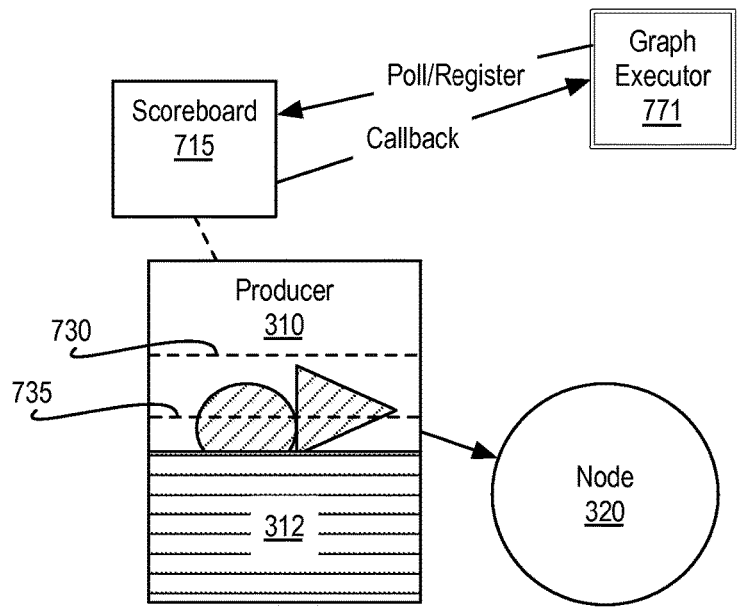
FIG. 7A is a functional block diagram further illustrating operation of a producer node, in accordance with some embodiments.

FIG. 7A is a functional block diagram further illustrating operation of a producer node 310. As graph executor 771 processes an image graph, graph executor 771 polls, or registers as a listener of, scoreboard object 715. Graph executor 771 determines first source image availability information from scoreboard object 715 indicating a first valid source buffer portion 730 is available for processing by node 320. In response, graph executor 771 schedules execution of a first (sub)task associated with one or more tiles in first valid source buffer portion 730. In some embodiments the first task is to be performed by a first hardware resource, such as but not limited to a CPU core, a GPU EU, or a IPU VU. Subsequently, graph executor 771 receives second source image availability information from scoreboard object 715 indicating a second valid source buffer portion 735 is available for processing by node 320. In response, graph executor 771 schedules execution of a second task associated with one or more tiles in second valid source buffer portion 735 and/or first valid source buffer portion 730. In some embodiments the second task is to be performed by a second hardware resource different than the first resource, such as but not limited to a CPU core, a GPU EU, or a IPU VU.

Figure 7B:
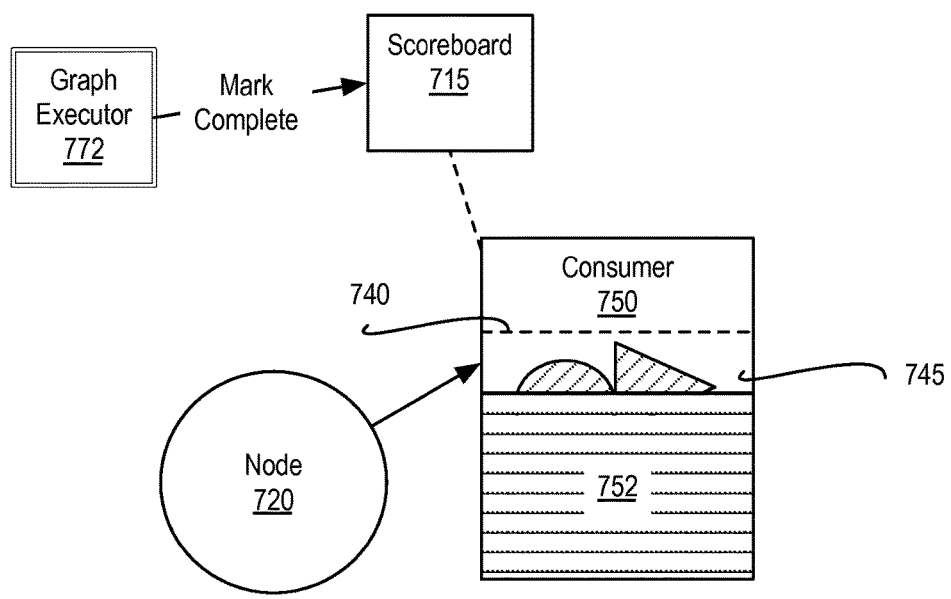
FIG. 7B is a functional block diagram further illustrating operation of a consumer node, in accordance with some embodiments.

FIG. 7B is a functional block diagram further illustrating operation of a consumer node 750. As graph executor 772 processes an image graph by passing data blocks through graph node 720, executor 772 updates scoreboard object 715 with destination image completeness information. For example, graph executor 772 updates scoreboard object 715 with first destination image completeness/availability information indicating there is a first valid destination buffer portion 740 with one or more data block (e.g., tile) that has passed through node 720. Subsequently, graph executor 772 updates scoreboard object 715 with destination image availability/completeness information to indicate there is a second valid destination buffer portion 745 with one or more data block that has passed through node 720.

Figure 7C:
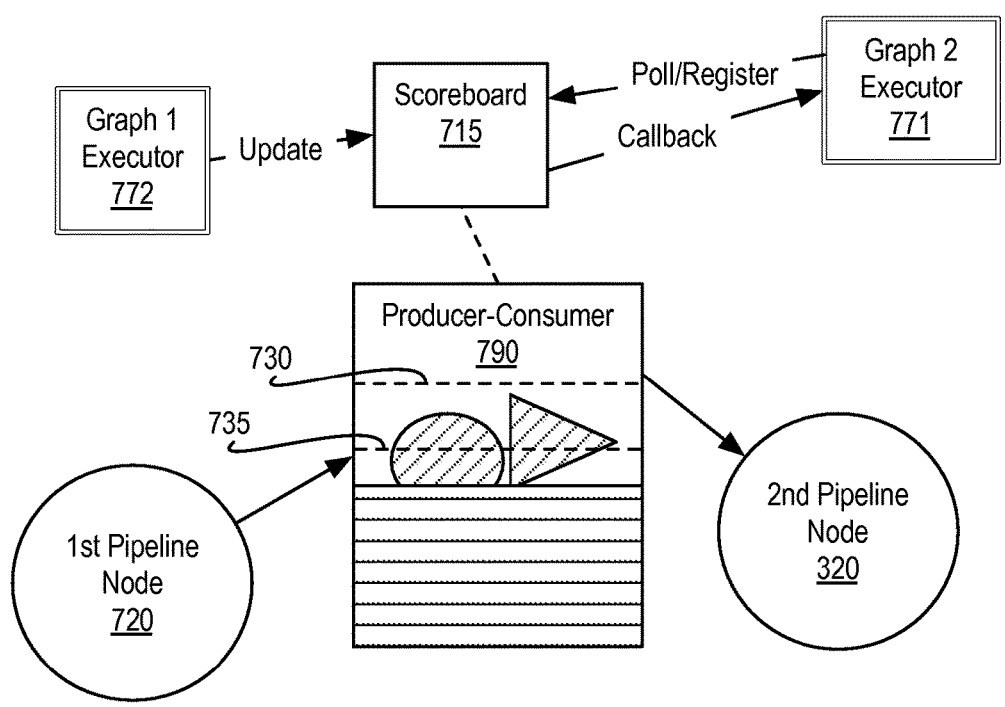
FIG. 7C is a functional block diagram further illustrating operation of a producer-consumer node, in accordance with some embodiments.

In some embodiments, a node is defined as both a producer and a consumer. Such a producer-consumer node may be defined by performing method 501 to link an input port of a processing node in a first image graph to a scoreboard functionalized node, and further performing method 502 to further link an output port of a processing node in a second image graph to the scoreboard functionalized node. An example of this graph architecture is illustrated in FIG. 7C. Producer-consumer node 790 provides an interface through which a first and second image graph pipeline communicate. A first graph executor 772 passes data blocks through first pipeline node 720 and updates scoreboard 715 with fine grain indications of data block validity. A second graph executor 771 passes data block through second pipeline node 320 based on fine grain indications of data block validity determined from scoreboard 715. As such, a data block of an image in first valid buffer portion 730 may be passed through second pipeline node 320 before first pipeline node 720 has completed processing all data blocks of the image, resulting in an efficient (e.g., parallelizable) loose coupling between two separate image processing tasks. Although a single scoreboard object 715 is illustrated in FIG. 7C, separate scoreboard objects may be associated with separate pipelines interfacing to a producer-consumer node. Furthermore, although two pipeline nodes 320 and 720 are illustrated in FIG. 7C, any number of pipeline nodes (e.g., 3, 4, 5, etc.) may be loosely coupled with a producer consumer node.

Figure 8:
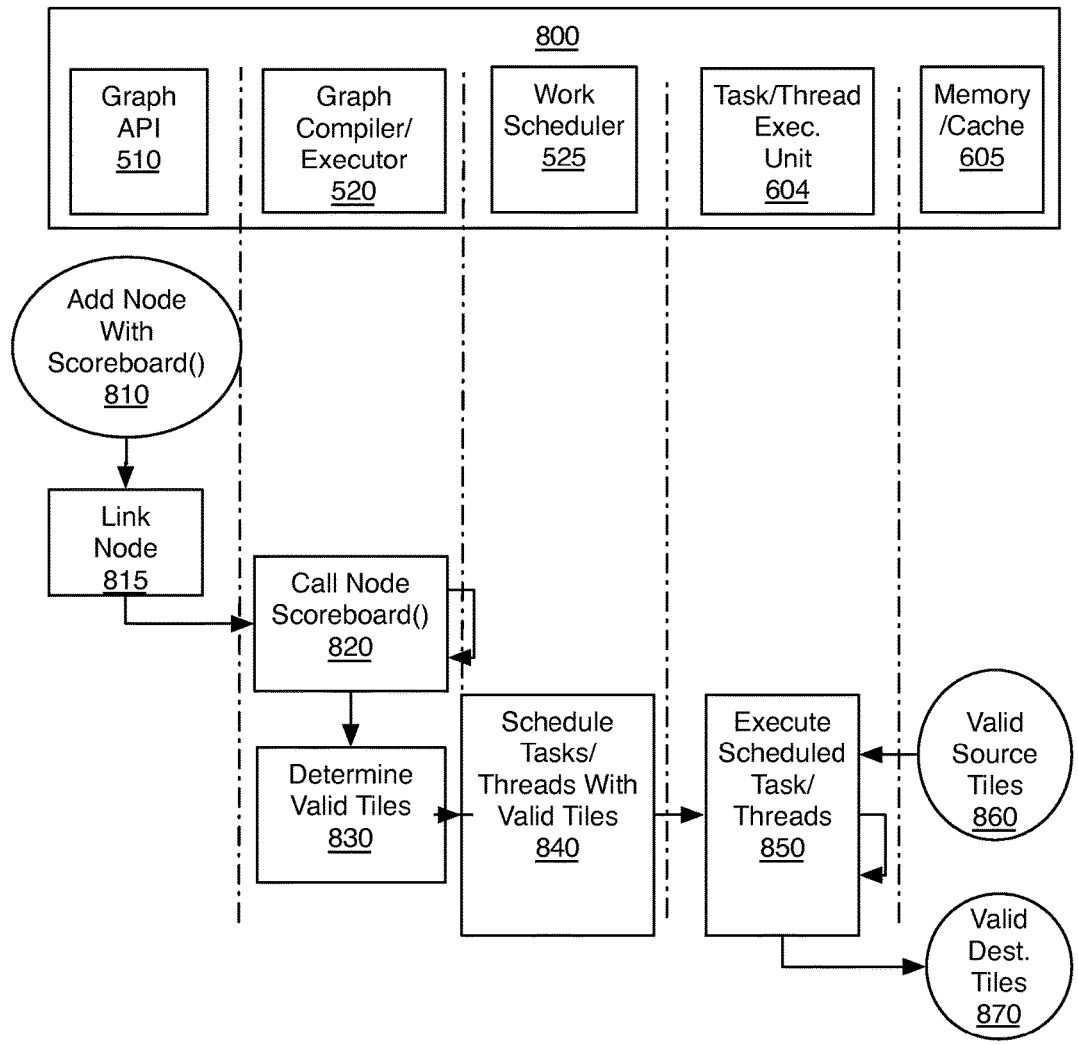
FIG. 8 is a functional block diagram illustrating an image processing pipeline implementation including producer and/or consumer node graph optimizations, in accordance with some embodiments.

FIG. 8 is a functional block diagram illustrating an image processing pipeline implementation 800 including producer and/or consumer node graph optimizations. Not all depicted operations need be performed by a single implementation or contemporaneously. For example, consumer/producer node creation operations 810, 815 may be performed during image pipeline develop time in advance of graph compile and/or execution operations 820, 830 performed during image pipeline runtime. In FIG. 8, vertical dash lines demark the functional elements enlisted in performance of the depicted operations. API 510 is employed to add and link graph nodes having fine-grained buffer management functionality at operations 810, 815. At operation 820, graph executor 520 issues calls to a node scoreboard function and determines data block validity information. Work scheduler 525 schedules tasks/threads based on node dependency and data block validity information at operation 840. Task/thread execution unit 604 (e.g., a CPU core, GPU EU, IPU VU, etc.) executes scheduled tasks/threads at operation 850, reading valid source tiles 860 from an electronic memory and/or cache 605, and writing valid destination tiles 870 to memory and/or cache 605.

Figure 9:
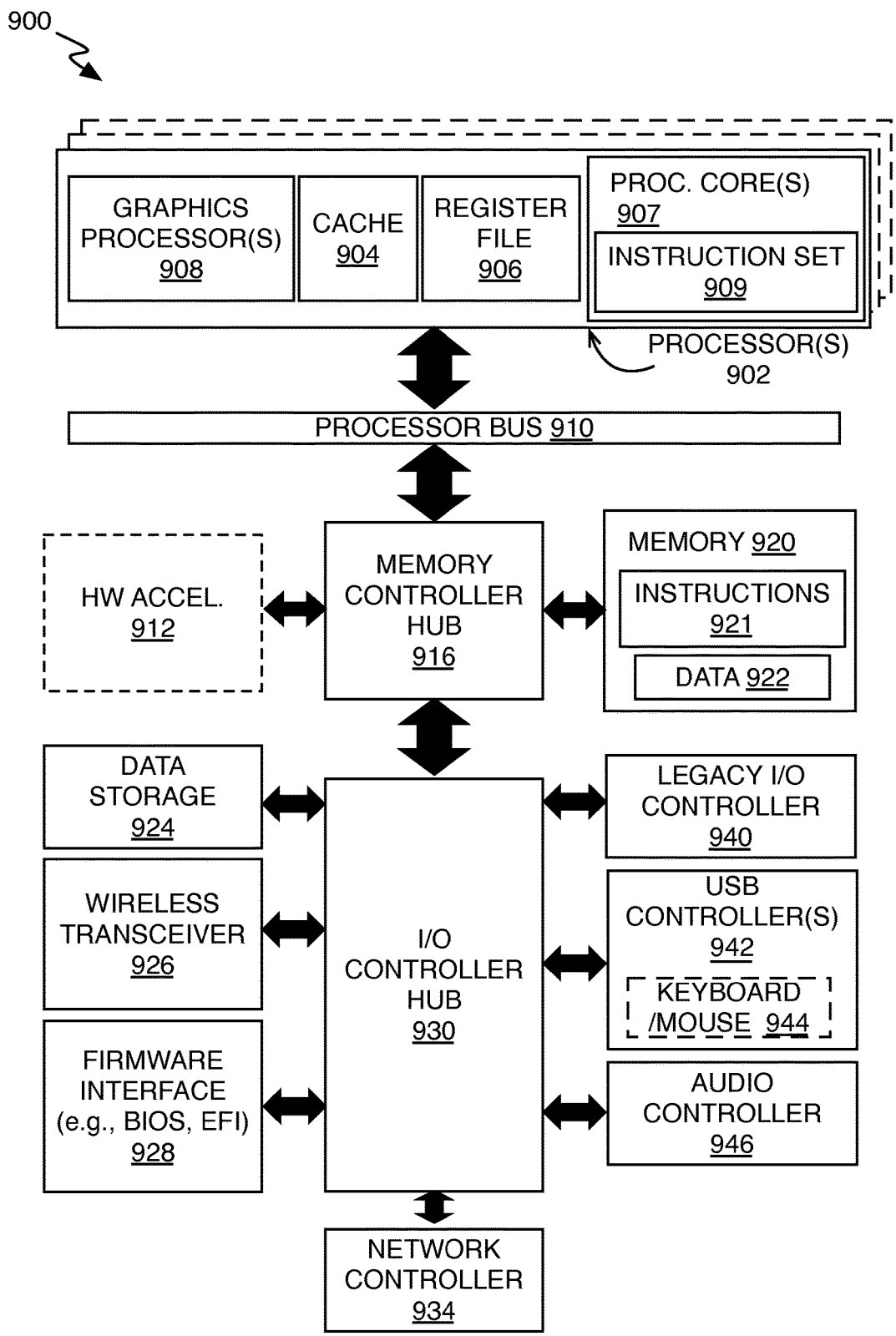
FIG. 9 is a functional block diagram of a data processing system, in accordance with some embodiments.

FIG. 9 is a functional block diagram of a data processing system 900 that may be utilized to perform graph processing with source and/or consumer nodes in accordance with some embodiments. Data processing system 900 includes one or more processors 902 and one or more graphics processors 908, and may be a single processor mobile device or desktop device, a multiprocessor workstation, or a server system having a large number of processors 902 or processor cores 907. In on embodiment, the data processing system 900 is a system-on-a-chip (SoC) integrated circuit for use in mobile, handheld, or embedded devices.

An embodiment of data processing system 900 can include, or be incorporated within a server-based gaming platform, a game console, including a game and media console, a mobile gaming console, a handheld game console, or an online game console. In some embodiments, data processing system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit data signals between processor 902 and other components in system 900. System 900 has a 'hub' system architecture, including a memory controller hub 916 and an input output (I/O) controller hub 930. Memory controller hub 916 facilitates communication between a memory device and other components of system 900, while I/O Controller Hub (ICH) 930 provides connections to I/O devices via a local I/O bus.

Memory device 920 can be a dynamic random access memory (DRAM) device, a static random access memory (SRAM) device, flash memory device, or some other memory device having suitable performance to serve as process memory. Memory 920 can store data 922 and instructions 921 for use when processor 902 executes a process. Memory controller hub 916 also couples with an optional external hardware accelerator 912, which may communicate with the one or more graphics processors 908 in processors 902 to perform graphics and media operations.

In some embodiments, ICH 930 enables peripherals to connect to memory 920 and processor 902 via a high-speed I/O bus. The I/O peripherals include an audio controller 946, a firmware interface 928, a wireless transceiver 926 (e.g., Wi-Fi, Bluetooth), a data storage device 924 (e.g., hard disk drive, flash memory, etc.), and a legacy I/O controller for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910.

Figure 10:
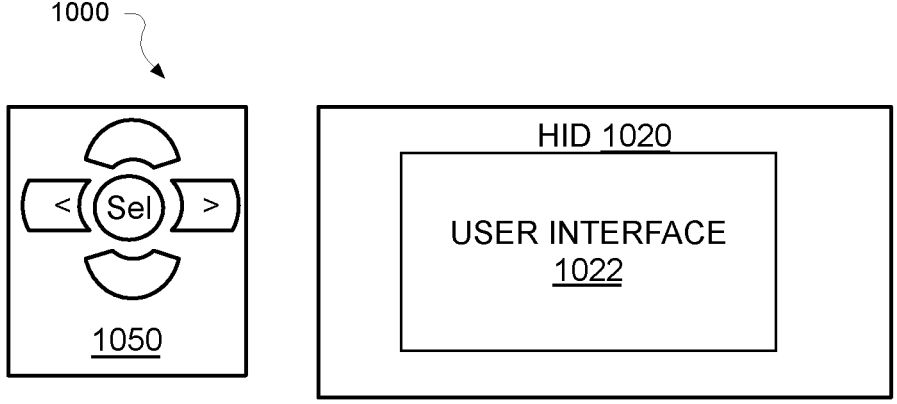
FIG. 10 is a diagram of an exemplary ultra-low power system including a processor with node defined data block based scheduling logic, in accordance with some embodiments.
Figure 10:
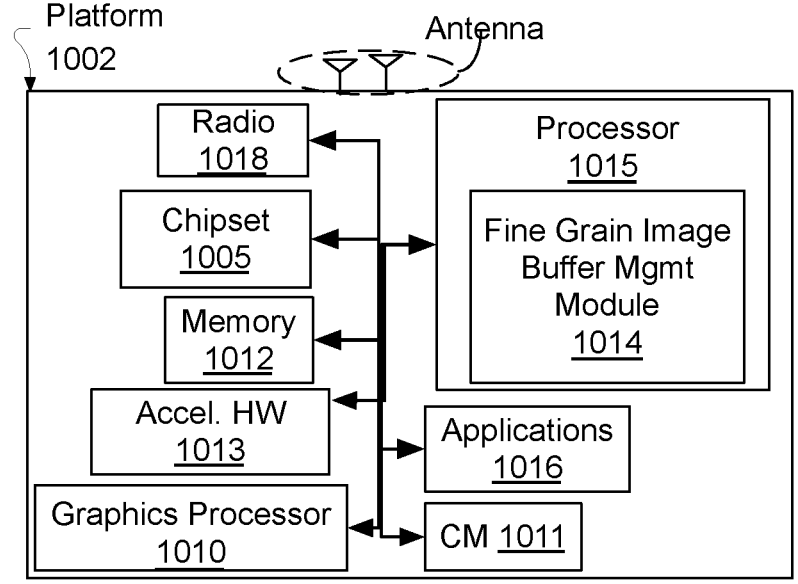
Figure 10:
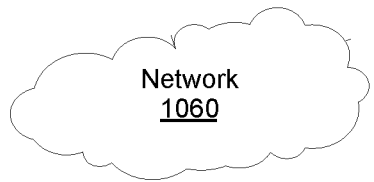

FIG. 10 is a diagram of an exemplary ultra-low power system 1000 employing a fine grain image buffer management module, in accordance with one or more embodiment. System 1000 may be a mobile device although system 1000 is not limited to this context. System 1000 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 1000 may also be an infrastructure device. For example, system 1000 may be incorporated into a large format television, set-top box, desktop computer, or other home or commercial network device.

System 1000 includes a device platform 1002 that may implement all or a subset of the various image graph producer and/or consumer nodes, scoreboard and/or callback methods described above in the context of FIG. 3A-FIG. 8. In embodiments, components of platform 1002 are further implemented following the architecture of system 900 (FIG. 9). In various exemplary embodiments, central processor 1015 implements fine grain image buffer management module 1014, for example including a graph executor and/or work scheduler configured to determine and account for cached data block validity, for example as described elsewhere herein. Central processor includes logic circuitry implementing an image graph executor configured to make producer and/or consumer node scoreboard function calls to determine data block validity, for example as described elsewhere herein. In some embodiments, one or more computer readable media may store instructions, which when executed by central processor 1015 and/or graphics processor 1010, cause the processor(s) to execute one or more fine grain buffer management operations.

In embodiments, device platform 1002 is coupled to a human interface device (HID) 1020. Platform 1002 may collect raw image data with a camera module (CM) 1011, which is processed and output to HID 1020. A navigation controller 1050 including one or more navigation features may be used to interact with, for example, device platform 1002 and/or HID 1020. In embodiments, HID 1020 may include any monitor or display coupled to platform 1002 via radio 1018 and/or network 1060. HID 1020 may include, for example, a computer display screen, touch screen display or similar user interface 1022, video monitor, television-like device, and/or a television.

In embodiments, device platform 1002 may include any combination of CM 1011, chipset 1005, processors 1010, 1015, memory/storage 1012, accelerator hardware 1013, applications 1016, and/or radio 1018. Chipset 1005 may provide intercommunication among processors 1010, 1015, memory 1012, accelerator 1013, applications 1016, or radio 1018.

One or more of processors 1010, 1015 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 1012 may be implemented as a volatile memory device such as, but not limited to, a Random Access Memory (RAM), Dynamic Random Access Memory (DRAM), or Static RAM (SRAM). Memory 1012 may also be implemented as a non-volatile storage device such as, but not limited to flash memory, battery backed-up SDRAM (synchronous DRAM), magnetic memory, phase change memory, and the like.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In embodiments, system 1000 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The producer and/or consumer node objects, object definitions, functions, and function calls comporting with exemplary embodiments described herein may be implemented in various hardware architectures, cell designs, or "IP cores."

Figure 11:
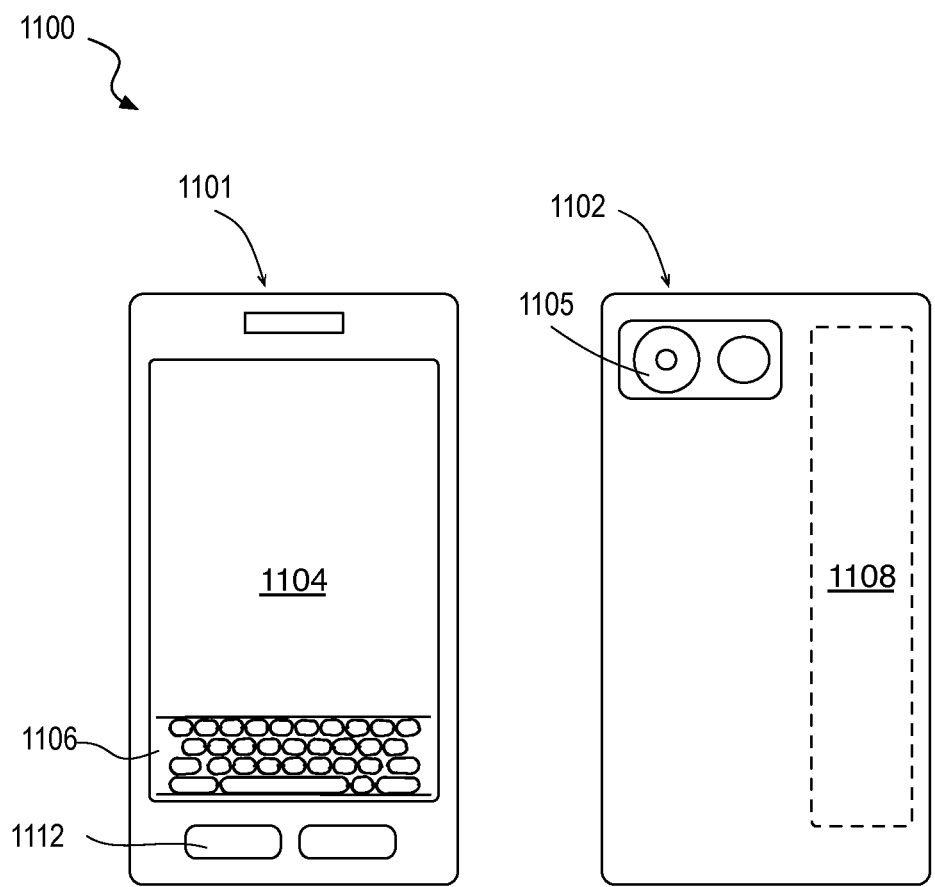
FIG. 11 is a diagram of an exemplary mobile handset platform, arranged in accordance with some embodiments.

As described above, system 1000 may be embodied in varying physical styles or form factors. FIG. 11 further illustrates embodiments of a mobile handset device 1100 in which platform 1002, system 1600, and/or implementation 1500 may be embodied. In embodiments, for example, device 1100 may be a mobile computing handset device having wireless and image processing capabilities. As shown in FIG. 11, mobile handset device 1100 may include a housing with a front 1101 and back 1102. Device 1100 includes a display 1104, an input/output (I/O) device 1106, and an integrated antenna 1108. Device 1100 also may include navigation features 1112. Display 1104 may include any suitable display unit for displaying information appropriate for a mobile computing device. I/O device 1106 may include any suitable L/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. Embodiments are not limited in this context. Integrated into at least the back 1102 is camera 1105 (e.g., including a lens, an aperture, and an imaging sensor), which may be components of one or more CM through which image data is exposed and output to graph optimized imaging pipeline, for example as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments.

In one or more first embodiments, an apparatus comprises an image graph executor to receive an image graph specifying a pipeline of image processing operations. The executor is further to determine, for a producer node in the graph, a valid portion of a source buffer storing a source image data block available for processing. The executor is further to schedule an image processing task limited to one or more source image data block stored in the valid portion of the source buffer.

In furtherance of the first embodiments, the image graph executor is to determine the valid portion of the source buffer through a scoreboard object associated with the producer node.

In furtherance of the embodiment immediately above, the image graph executor is to schedule a first image processing task on a first hardware resource to process a first source image data block stored in a valid portion of the source buffer identified in first buffer validity information determined from a first call to the scoreboard object. The executor is also to schedule a second image processing task on a second hardware resource to process a second source image data block stored in a valid portion of the source buffer identified in second buffer validity information determined from a second call to the scoreboard object.

In furtherance of the embodiment immediately above, the image graph executor is to schedule the second image processing task before all portions of the source buffer are valid.

In furtherance of the first embodiments, the buffer validity information comprises one or more of: a valid buffer size; valid buffer proportion; an invalid buffer size; an invalid buffer proportion; a valid or invalid buffer position index; or specific source buffer memory address or address offset for each valid or invalid data block stored in the buffer.

In furtherance of the first embodiments, the apparatus further comprises a graph-based implementation application programming interface (API) configured to associate a producer node of an image processing graph with one or more fine grain source buffer management functions.

In furtherance of the embodiment immediately above, the API includes a scoreboard object or function to associate validity state information with portions of the source buffer.

In one or more second embodiment, a computer implemented image processing method comprises receiving an image graph specifying a pipeline of image processing operations, determining for a producer node in the graph a valid portion of a source buffer storing a source image data block available for processing, and scheduling an image processing task limited to one or more source image data block stored in the valid portion of the source buffer.

In furtherance of the embodiment immediately above, the method further comprises determining the valid portion of the source buffer through a scoreboard object associated with the producer node.

In furtherance of the embodiment immediately above, the method further comprises scheduling a first image processing task on a first hardware resource to process a first source image data block stored in a valid portion of the source buffer identified in first buffer validity information determined from a first call to the scoreboard object. The method further comprises scheduling a second image processing task on a second hardware resource to process a second source image data block stored in a valid portion of the source buffer identified in second buffer validity information determined from a second call to the scoreboard object.

In furtherance of the embodiment immediately above, the method further comprises scheduling the second image processing task before all portions of the source buffer are valid.

In one or more third embodiments, one or more computer-readable storage media have instructions stored thereon, which when executed by a processor, cause the processor to perform any one of the second embodiments.

In furtherance of the third embodiments, one or more computer-readable storage media have instructions stored thereon, which when executed by a processor, cause the processor to perform a method comprising determining, for a producer node in an image graph specifying a pipeline of image processing operations, a valid portion of a source buffer storing a source image data block available for processing, and scheduling an image processing task limited to one or more source image data block stored in the valid portion of the source buffer.

In one or more fourth embodiments, an apparatus, comprises an image graph executor to receive an image graph specifying a pipeline of image processing operations. The executor further to determine, for a consumer node in the graph, a valid portion of a destination buffer storing a destination image data block that has completed processing. The executor further to update a scoreboard object with validity information indicative of the valid portion of the destination buffer.

In furtherance of the fourth embodiments, the image graph executor is to update a scoreboard object associated with the consumer node with buffer validity information indicative of one or more data block passing through an image processing node having an output coupled to the consumer node.

In furtherance of the fourth embodiment immediately above, the image graph executor is to update the scoreboard object with first buffer validity information in response to completing a first image processing task on a first hardware resource that generates a first source image data block stored in a portion of the destination buffer identified in the first buffer validity information. The executor is further to update the scoreboard object with second buffer validity information in response to completing a second image processing task on a second hardware resource that generates a second source image data block stored in a portion of the destination buffer identified in the second buffer validity information.

In furtherance of the fourth embodiment immediately above, the buffer validity information comprises one or more of: a valid buffer size; valid buffer proportion; an invalid buffer size; an invalid buffer proportion; a valid or invalid buffer position index; or specific source buffer memory address or address offset for each valid or invalid data block stored in the buffer.

In furtherance of the fourth embodiments, the apparatus further comprises a graph-based implementation application programming interface (API) configured to associate a node of an image processing graph with one or more fine grain source buffer management functions.

In furtherance of the fourth embodiment immediately above, the API includes a scoreboard object or function to associate validity state information with portions of the destination buffer.

In one or more fifth embodiments, a computer implemented image processing method comprises receiving an image graph specifying a pipeline of image processing operations, determining, for a consumer node in the graph, a valid portion of a destination buffer storing a destination image data block that has completed processing, and updating a scoreboard object with validity information indicative of the valid portion of the destination buffer.

In furtherance of the fifth embodiments, the method further comprises updating a scoreboard object associated with the consumer node, with buffer validity information indicative of one or more data block passing through an image processing node having an output coupled to the consumer node.

In furtherance of the fifth embodiment immediately above, the method further comprises updating the scoreboard object with first buffer validity information in response to completing a first image processing task on a first hardware resource that generates a first source image data block stored in a portion of the destination buffer identified in the first buffer validity information. The method further comprises updating the scoreboard object with second buffer validity information in response to completing a second image processing task on a second hardware resource that generates a second source image data block stored in a portion of the destination buffer identified in the second buffer validity information.

In one or more sixth embodiments, one or more computer-readable storage media includes instructions stored thereon, which when executed by a processor, cause the processor to perform any one of the sixth embodiments.

In furtherance of the sixth embodiments, one or more computer-readable storage media includes instructions stored thereon, which when executed by a processor, cause the processor to perform a method comprising determining, for a consumer node in the graph, a valid portion of a destination buffer storing a destination image data block that has completed processing, and updating a scoreboard object with validity information indicative of the valid portion of the destination buffer.

In one or more seventh embodiments, an apparatus comprises means to perform any one of the second embodiments or fifth embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:
1. An apparatus, comprising:
one or more processors to:
receive an image graph specifying a pipeline of image processing operations;
determine, for a producer node in the graph, a valid portion of a source buffer storing a source image data block available for processing; and schedule an image processing task limited to one or more source image data block stored in the valid portion of the source buffer; and one or more hardware resources to execute the image processing task as scheduled.

2. The apparatus of claim 1, wherein the processors are to determine the valid portion of the source buffer through a scoreboard object associated with the producer node.

3. The apparatus of claim 2, wherein the processors are to:
schedule a first image processing task on a first hardware resource to process a first source image data block stored in a valid portion of the source buffer identified in first buffer validity information determined from a first call to the scoreboard object; and
schedule a second image processing task on a second hardware resource to process a second source image data block stored in a valid portion of the source buffer identified in second buffer validity information determined from a second call to the scoreboard object.

4. The apparatus of claim 3, wherein the processors are to schedule the second image processing task before all portions of the source buffer are valid.

5. The apparatus of claim 3, wherein the buffer validity information comprises one or more of: a valid buffer size; valid buffer proportion; an invalid buffer size; an invalid buffer proportion; a valid or invalid buffer position index; or specific source buffer memory address or address offset for each valid or invalid data block stored in the buffer.

6. The apparatus of claim 1, further comprising:
a graph-based implementation application programming interface (API) configured to associate a producer node of an image processing graph with one or more fine grain source buffer management functions.

7. The apparatus of claim 6, wherein the API includes a scoreboard object or function to associate validity state information with portions of the source buffer.

8. A computer implemented image processing method comprising:
receiving an image graph specifying a pipeline of image processing operations;
determining, for a producer node in the graph, a valid portion of a source buffer storing a source image data block available for processing;
scheduling an image processing task limited to one or more source image data block stored in the valid portion of the source buffer; and
executing the image processing task as scheduled.

9. The method of claim 8, further comprising determining the valid portion of the source buffer through a scoreboard object associated with the producer node.

10. The method of claim 9, wherein scheduling the image processing task further comprises:
scheduling a first image processing task on a first hardware resource to process a first source image data block stored in a valid portion of the source buffer identified in first buffer validity information determined from a first call to the scoreboard object; and
scheduling a second image processing task on a second hardware resource to process a second source image data block stored in a valid portion of the source buffer identified in second buffer validity information determined from a second call to the scoreboard object.

11. The method of claim 10, further comprising scheduling the second image processing task before all portions of the source buffer are valid.

12. One or more non-transitory computer-readable storage media, with instructions stored thereon, which when executed by a processor, cause the processor to perform a method comprising:
determining, for a producer node in an image graph specifying a pipeline of image processing operations, a valid portion of a source buffer storing a source image data block available for processing;
scheduling an image processing task limited to one or more source image data block stored in the valid portion of the source buffer; and
executing the image processing task as scheduled.

13. An apparatus, comprising:
one or more processors to:
receive an image graph specifying a pipeline of image processing operations;
determine, for a consumer node in the graph, a valid portion of a destination buffer storing a destination image data block that has completed processing;
update a scoreboard object with validity information indicative of the valid portion of the destination buffer; and
schedule an image processing task validity information; and
one or more hardware resources to execute an image processing task as scheduled.

14. The apparatus of claim 13, wherein the processors are to update a scoreboard object associated with the consumer node with buffer validity information indicative of one or more data block passing through an image processing node having an output coupled to the consumer node.

15. The apparatus of claim 14, wherein the processors are to:
update the scoreboard object with first buffer validity information in response to completing a first image processing task on a first hardware resource that generates a first source image data block stored in a portion of the destination buffer identified in the first buffer validity information; and
update the scoreboard object with second buffer validity information in response to completing a second image processing task on a second hardware resource that generates a second source image data block stored in a portion of the destination buffer identified in the second buffer validity information.

16. The apparatus of claim 15, wherein the buffer validity information comprises one or more of: a valid buffer size; valid buffer proportion; an invalid buffer size; an invalid buffer proportion; a valid or invalid buffer position index; or specific source buffer memory address or address offset for each valid or invalid data block stored in the buffer.

17. The apparatus of claim 14, further comprising:
a graph-based implementation application programming interface (API) configured to associate a node of an image processing graph with one or more fine grain source buffer management functions.

18. The apparatus of claim 17, wherein the API includes a scoreboard object or function to associate validity state information with portions of the destination buffer.

19. A computer implemented image processing method comprising:
receiving an image graph specifying a pipeline of image processing operations;
determining, for a consumer node in the graph, a valid portion of a destination buffer storing a destination image data block that has completed processing;

updating a scoreboard object with validity information indicative of the valid portion of the destination buffer;

scheduling an image processing task based on the validity information; and executing an image processing task as scheduled.

20. The method of claim 19, further comprising updating a scoreboard object associated with the consumer node, with buffer validity information indicative of one or more data block passing through an image processing node having an output coupled to the consumer node.

21. The method of claim 20, further comprising updating the scoreboard object with first buffer validity information in response to completing a first image processing task on a first hardware resource that generates a first source image data block stored in a portion of the destination buffer identified in the first buffer validity information; and updating the scoreboard object with second buffer validity information in response to completing a second image processing task on a second hardware resource that generates a second source image data block stored in a portion of the destination buffer identified in the second buffer validity information.

22. One or more non-transitory computer-readable storage media, with instructions stored thereon, which when executed by a processor, cause the processor to perform a method comprising:

determining, for a consumer node in the graph, a valid portion of a destination buffer storing a destination image data block that has complete processing;

updating a scoreboard object with validity information indicative of the valid portion of the destination buffer;

scheduling an image processing task based on the validity information; and executing an image processing task as scheduled.

* * * * *